United States Patent
Gu et al.

(10) Patent No.: US 9,819,688 B2
(45) Date of Patent: *Nov. 14, 2017

(54) PEER ENROLLMENT METHOD, ROUTE UPDATING METHOD, COMMUNICATION SYSTEM, AND RELEVANT DEVICES

(71) Applicant: Huawei Technologies Co., Ltd., Shenzhen (CN)

(72) Inventors: Yingjie Gu, Nanjing (CN); Xingfeng Jiang, Nanjing (CN); Haibin Song, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 16 days.

This patent is subject to a terminal disclaimer.

(21) Appl. No.: 14/543,381

(22) Filed: Nov. 17, 2014

(65) Prior Publication Data

US 2015/0074779 A1 Mar. 12, 2015

Related U.S. Application Data

(63) Continuation of application No. 13/272,686, filed on Oct. 13, 2011, now Pat. No. 8,910,252, which is a
(Continued)

(30) Foreign Application Priority Data

Apr. 14, 2009 (CN) .......................... 2009 1 0130091

(51) Int. Cl.
*H04L 29/06* (2006.01)
*G06F 21/44* (2013.01)
*H04L 29/08* (2006.01)

(52) U.S. Cl.
CPC ............ *H04L 63/126* (2013.01); *G06F 21/44* (2013.01); *H04L 63/08* (2013.01);
(Continued)

(58) Field of Classification Search
CPC . H04L 63/08; H04L 63/0823; H04L 63/1466; H04L 63/126; G06F 21/44
See application file for complete search history.

(56) References Cited

U.S. PATENT DOCUMENTS

| 6,308,273 B1 | 10/2001 | Goertzel et al. |
| 7,359,955 B2 | 4/2008 | Menon et al. |

(Continued)

FOREIGN PATENT DOCUMENTS

| CN | 1447256 A | 10/2003 |
| CN | 1506866 A | 6/2004 |

(Continued)

OTHER PUBLICATIONS

M. Castro, P. Druschel, A. M. Kermarrec and A. I. T. Rowstron, "Scribe: a large-scale and decentralized application-level multicast infrastructure," in IEEE Journal on Selected Areas in Communications, vol. 20, No. 8, pp. 1489-1499, Oct. 2002.*

(Continued)

*Primary Examiner* — Kari Schmidt
(74) *Attorney, Agent, or Firm* — Leydig, Voit & Mayer, Ltd.

(57) ABSTRACT

A peer enrollment method, a route updating method, a communication system, and relevant devices to improve security of a peer-to-peer (P2P) network. The peer enrollment method includes: receiving an enrollment request from a peer, where the enrollment request carries identity information of the peer; verifying the identity information of the peer, and if the verification succeeds, obtaining peer location information of the peer and generating a peer credential according to the peer location information; and sending the peer credential carrying the peer location information to the peer so that the peer joins the P2P network according to the peer credential. Embodiments of the present application further provide a route updating method, a communication (Continued)

system, and relevant devices. Embodiments of the present application may improve security of the P2P network effectively.

14 Claims, 5 Drawing Sheets

Related U.S. Application Data continuation of application No. PCT/CN2010/071581, filed on Apr. 7, 2010.

(52) U.S. Cl.
CPC ...... *H04L 63/0823* (2013.01); *H04L 63/1466* (2013.01); *H04L 67/104* (2013.01); *H04L 67/1046* (2013.01)

(56) References Cited

U.S. PATENT DOCUMENTS

| | | | |
|---|---|---|---|
| 8,196,186 | B2 | 6/2012 | Mityagin et al. |
| 8,477,658 | B2* | 7/2013 | Tsang ............... H04L 12/5695 370/254 |
| 2003/0056094 | A1 | 3/2003 | Huitema et al. |
| 2003/0131129 | A1 | 7/2003 | Becker et al. |
| 2003/0174648 | A1* | 9/2003 | Wang ............... H04L 65/1013 370/235 |
| 2004/0042403 | A1 | 3/2004 | Xu et al. |
| 2004/0088347 | A1* | 5/2004 | Yeager ............... H04L 67/104 709/202 |
| 2004/0088348 | A1* | 5/2004 | Yeager ............... H04L 67/104 709/202 |
| 2004/0088369 | A1* | 5/2004 | Yeager ............... H04L 67/104 709/217 |
| 2004/0088646 | A1* | 5/2004 | Yeager ............... H04L 29/06 715/229 |
| 2004/0133640 | A1* | 7/2004 | Yeager ............... G06F 9/4862 709/204 |
| 2005/0036651 | A1* | 2/2005 | Wen ............... G06T 1/0028 382/100 |
| 2005/0108546 | A1 | 5/2005 | Lehew et al. |
| 2005/0172333 | A1 | 8/2005 | Kim |
| 2005/0251577 | A1 | 11/2005 | Guo et al. |
| 2005/0265346 | A1 | 12/2005 | Ho et al. |
| 2006/0130131 | A1* | 6/2006 | Pai ............... H04L 63/0823 726/9 |
| 2007/0094494 | A1 | 4/2007 | Banerjee et al. |
| 2007/0097986 | A1* | 5/2007 | Abu-Amara ...... H04L 29/12047 370/395.31 |
| 2008/0080530 | A1* | 4/2008 | Kaler ............... G06F 9/5061 370/401 |
| 2008/0224823 | A1* | 9/2008 | Lawson ............... G06F 21/34 340/5.8 |
| 2009/0187766 | A1* | 7/2009 | Vuillaume ............... G06F 21/33 713/176 |
| 2009/0265473 | A1* | 10/2009 | Hydrie ............... H04L 67/104 709/229 |
| 2010/0017330 | A1* | 1/2010 | Tan ............... G06Q 10/06 705/50 |
| 2010/0050235 | A1 | 2/2010 | Hardie et al. |
| 2010/0115572 | A1 | 5/2010 | Chen |
| 2012/0036564 | A1 | 2/2012 | Gu et al. |

FOREIGN PATENT DOCUMENTS

| | | | |
|---|---|---|---|
| CN | 1536834 | A | 10/2004 |
| CN | 1545243 | A | 11/2004 |
| CN | 1567196 | A | 1/2005 |
| CN | 1628462 | A | 6/2005 |
| CN | 1649294 | A | 8/2005 |
| CN | 1681257 | A | 10/2005 |
| CN | 1708026 | A | 12/2005 |
| CN | 1710882 | A | 12/2005 |
| CN | 1710906 | A | 12/2005 |
| CN | 101017504 | A | 8/2007 |
| CN | 101026632 | A | 8/2007 |
| CN | 101094060 | A | 12/2007 |
| CN | 101146021 | A | 3/2008 |
| CN | 101212646 | A | 7/2008 |
| CN | 101227292 | A | 7/2008 |
| CN | 101237467 | A | 8/2008 |
| CN | 101242365 | A | 8/2008 |
| CN | 101729362 | A | 6/2010 |
| CN | 101534309 | B | 3/2013 |
| EP | 1560396 | A2 | 8/2005 |
| WO | WO 2010118666 | A1 | 10/2010 |

OTHER PUBLICATIONS

Kraxberger, Stefan, and Udo Payer. "Security concept for peer-to-peer systems." Proceedings of the 2009 International Conference on Wireless Communications and Mobile Computing: Connecting the World Wirelessly. pp. 931-936, ACM, 2009.*

Ege, "Trusted P2P Media Delivery to Mobile Devices," 2010 Fifth International Conference on Systems, pp. 140-145, Institute of Electrical and Electronics Engineers, New York, New York (Apr. 11-16, 2010).

Niazi, "Self-organized Customized Content Delivery Architecture for Ambient Assisted Environments," Upgrade '08: Proceedings of the Third International Workshop on Use of P2P, Grid and Agents for the Development of Content Networks, pp. 45-54, Association for Computing Machinery, New York, New York (2008).

Moffatt, "Building a Distributed Authenticating CDN," 2011 Conference on Data and Knowledge Engineering, pp. 55-59, Institute of Electrical and Electronics Engineers, New York, New York (Sep. 6, 2011).

Jennings et al., "Resource Location and Discovery (RELOAD) Base Protocol draft-ietf-p2psip-base-02," P2PSIP, Internet Draft, Standards Track, The Internet Society, Reston, Virginia (Mar. 7, 2009).

Aiello et al., "Tempering Kademlia with a Robust Identity Based System," Eighth IEEE International Conference on Peer-to-Peer Computing, pp. 30-39, Institute of Electrical and Electronics Engineers, New York, New York (Sep. 8-11, 2008).

Hilt et al., "A Survey on Research on the Application-Layer Traffic Optimization (ALTO) Problem draft-hilt-alto-survey-00," Network working group, Internet Draft, Informational, The Internet Society, Reston, Virginia (Jul. 3, 2008).

Wang et al., "An Efficient and Secure Peer-to Peer Overlay Network," IEEE Conference on Local Computer Networks 30th Anniversary, Institute of Electrical and Electronics Engineers, New York, New York (2005).

Office Action in corresponding U.S. Appl. No. 13/272,686 (dated Apr. 12, 2013).

Final Office Action in corresponding U.S. Appl. No. 13/272,686 (dated Nov. 20, 2013).

Notice of Allowance in corresponding U.S. Appl. No. 13/272,686 (dated Aug. 19, 2014).

* cited by examiner

PEER ENROLLMENT METHOD, ROUTE UPDATING METHOD, COMMUNICATION SYSTEM, AND RELEVANT DEVICES

CROSS-REFERENCE TO RELATED APPLICATIONS

This application is a continuation of U.S. patent application Ser. No. 13/272,686, filed Oct. 13, 2011, which is a continuation of International Patent Application No. PCT/CN2010/071581, filed Apr. 7, 2010, which claims priority to Chinese Patent Application No. 200910130091.X, filed Apr. 14, 2009, all of which are hereby incorporated by reference in their entireties.

FIELD OF THE APPLICATION

The present application relates to the communications field, and in particular, to a peer enrollment method, a route updating method, a communication system, and relevant devices.

BACKGROUND OF THE APPLICATION

A peer-to-peer (P2P) network is a technology widely applied on the Internet at present, and can fully use idle capabilities of a terminal to serve the whole system.

A structured P2P network maintains a distributed hash table, which is divided into multiple segments. Each peer in the network stores and maintains one segment. The peers in the structured P2P network deliver and search for content in a complete self-organizing mode.

In a delivery and search process, a routing table of the peers that information passes through is required. According to routing table information, a peer judges which peer current information is sent to, so that the current information can reach the final destination peer quickly. Accuracy of the routing table directly decides correctness of P2P content delivery and search. In the P2P network, due to frequent flapping of the network, the routing table of peers needs to be updated continuously. The routing table is often updated periodically, or an updating process is initiated according to the actual requirement.

The routing table is a main target of a P2P security attack. A malicious peer tampers with routing table information or spoofs other peers to receive a false routing table, for the purpose of polluting the network and obtaining resources illegally, for example, directing the content delivery request of a user to the malicious peer and stealing the content delivered by the user, or directing the search request of a user to the malicious peer and spoofing the user by using false or even malicious content. Therefore, a routing table security policy needs to be provided to decrease the risks of network attacks.

A defending method in the prior art is: distrusting route information sent by all peers and performing check and authentication every time route information is received. The specific method is as follows:

When a new peer joins a network, the peer sends join information for joining the network through a bootstrap peer, and collects route information of other peers to create its own initial routing table. After the initial routing table is created, the new peer sends an authentication message to peers in the obtained routing table to confirm that the route information provided by those peers is correct.

However, in the above technical solution, if the other peers in the network are malicious, and the routing table provided by those peers to the new peer includes malicious routes, the new peer cannot identify malicious routes because it can verify correctness of the routing table with only those peers, lowering security of the network.

SUMMARY

Embodiments of the present application provide a peer enrollment method, a route updating method, a communication system, and relevant devices to improve security of route updating in a P2P network.

A peer enrollment method provided in an embodiment of the present application includes:

receiving an enrollment request of a peer, where the enrollment request carries identity information of the peer;

verifying the identity information of the peer, and if the verification succeeds, obtaining peer location information of the peer, and generating a peer credential according to the peer location information; and sending the peer credential carrying the peer location information to the peer so that the peer joins a P2P network according to the peer credential.

A route updating method provided in an embodiment of the present application includes:

receiving, by a first peer, a client message sent by a second peer;

obtaining, by the first peer, a peer credential of the second peer according to the client message, wherein the peer credential is sent by an enrollment server to the second peer when the second peer is enrolled; and judging, by the first peer, according to peer location information of the first peer and peer location information of the second peer that is in the peer credential, whether the second peer is the peer closest to the first peer in physical distance, and if the second peer is the peer closest to the first peer in physical distance, updating a routing table stored by the first peer.

A communication system provided in an embodiment of the present application includes:

an enrollment server, configured to: receive an enrollment request of a peer, wherein the enrollment request carries identity information of the peer; verify the identity information of the peer; if the verification succeeds, obtain peer location information of the peer, and send a peer credential carrying the peer location information to the peer; and the peer, configured to: send the enrollment request to the enrollment server, wherein the enrollment request carries the identity information of the peer; receive the peer credential that is sent by the enrollment server and carries the peer location information; and join a peer-to-peer network according to the peer credential.

Another communication system provided in an embodiment of the present application includes a first peer and a second peer, where:

the first peer is configured to: receive a client message sent by the second peer, and obtain a peer credential of the second peer according to the client message, wherein the peer credential is sent by an enrollment server to the second peer when the second peer is enrolled; and judge whether the second peer is a peer closest to the first peer in physical distance according to peer location information of the first peer and peer location information of the second peer that is in the peer credential, and if the second peer is the peer closest to the first peer in physical distance, update a routing table stored by the first peer; and the second peer is configured to send the client message to the first peer.

A server provided in an embodiment of the present application includes:

a receiving unit, configured to receive an enrollment request of a peer, wherein the enrollment request carries identity information of the peer;

a verifying unit, configured to verify the identity information of the peer;

an obtaining unit, configured to obtain peer location information of the peer after the verifying unit verifies the identity information successfully;

a credential generating unit, configured to generate a peer credential according to the peer location information; and a sending unit, configured to send the peer credential carrying the peer location information to the peer so that the peer joins a peer-to-peer network according to the peer credential.

A network peer provided in an embodiment of the present application includes:

a message receiving unit, configured to receive a client message sent by a second peer;

a credential receiving unit, configured to receive a peer credential sent by the second peer, wherein the peer credential is sent by an enrollment server to the second peer when the second peer is enrolled;

a distance judging unit, configured to judge whether the second peer is a peer closest to the network peer in physical distance according to peer location information of the network peer and peer location information of the second peer that is in the peer credential; and a route updating unit, configured to update a routing table if the second peer is the peer closest to the network peer in physical distance.

The foregoing technical solution shows that the embodiments of the present application bring the following advantages:

In the embodiments of the present application, when the first peer receives the client message from the second peer, the first peer may obtain a peer credential from the second peer and extract peer location information of the second peer from the peer credential, and therefore decide whether route updating is necessary. The peer credential is sent by the enrollment server to the second peer when the second peer is enrolled. It is difficult for the second peer to fake the peer credential. Therefore, a malicious peer can be prevented from sending malicious route information, and security of route updating in the P2P network is further improved.

DETAILED DESCRIPTION OF THE EMBODIMENTS

Embodiments of the present application provide a peer enrollment method, a route updating method, a communication system, and relevant devices to improve security of route updating in a P2P network.

Figure 1:
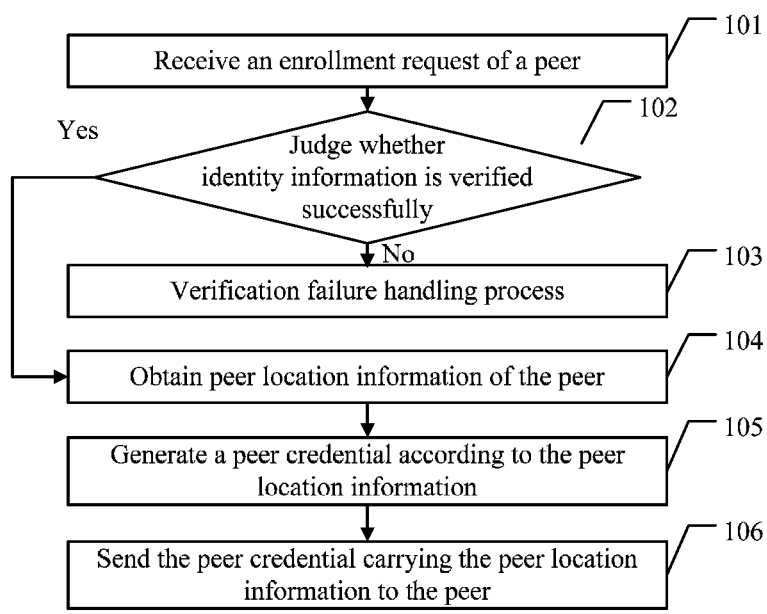
FIG. 1 is a flowchart of a peer enrollment method according to an embodiment of the present application.

As shown in FIG. 1, a peer enrollment method provided in an embodiment of the present application includes the following steps:

101. Receive an enrollment request of a peer.

In this embodiment, when a new peer requests joining an existing P2P network, the peer sends an enrollment request to an enrollment server, where the enrollment request carries identity information of the peer. The specific identity information may be a peer ID, or a peer name, or any other information that can uniquely specify the peer, and is not limited here.

102. Judge whether identity information of the peer is verified successfully, and if the verification succeeds, execute step 104; if the verification fails, execute step 103.

After receiving the enrollment request sent by the peer, the enrollment server verifies the identity information carried in the request. The specific verification process may be as follows: judge whether the peer belongs to a preset blacklist or whether the peer belongs to a list that allows to join the P2P network. Or other verification modes may also be used, and the specific mode is not limited here.

103. Execute a verification failure handling process and end the process of this embodiment.

If the enrollment server finds that the peer is an illegal peer or is not entitled to join the P2P network in the verification process of the peer, the enrollment server determines that the verification fails, and triggers the verification failure handling process. The specific process may be as follows: return verification failure information to the peer, or send a re-verification notification to the peer. Or other handling processes may be executed, and the specific handling process is not limited here.

104. Obtain peer location information of the peer.

If the enrollment server verifies the peer successfully, peer location information of the peer may be obtained. The peer location information may be obtained in multiple ways, which are detailed in the subsequent embodiments.

In this embodiment, the peer location information may be an autonomous system ID, or an area ID, or peer coordinates, or an address of an edge server providing services for the peer, or other information that can identify the location of the peer, and is not limited here.

105. Generate a peer credential according to the peer location information.

After the enrollment server obtains the peer location information of the peer, the peer location information is carried in the peer credential. The peer credential may be a preset template structure, is generated by the enrollment server, and carries information used for anti-counterfeiting. Each peer may identify the anti-counterfeiting information through some special algorithms to determine whether the peer credential is a legal credential. The specific process is detailed in the subsequent embodiments.

106. Send the peer credential carrying the peer location information to the peer.

In this embodiment, after the enrollment server sends the peer credential carrying the peer location information to the peer, the peer carries the peer credential when joining the P2P network. By using the peer credential of other peers in the P2P network, the routing table of each peer can be updated. Because the peer credential of each peer is issued by the enrollment server uniformly, it is difficult for a malicious peer to modify the peer credential, that is, it is difficult to modify peer location information of the peer, the malicious peer is effectively prevented from advertising malicious routes and security of the P2P network is improved.

For ease of understanding, the following details the above peer enrollment method with reference to two specific instances.

I. The enrollment server obtains peer location information through a topology information server.

Figure 2:
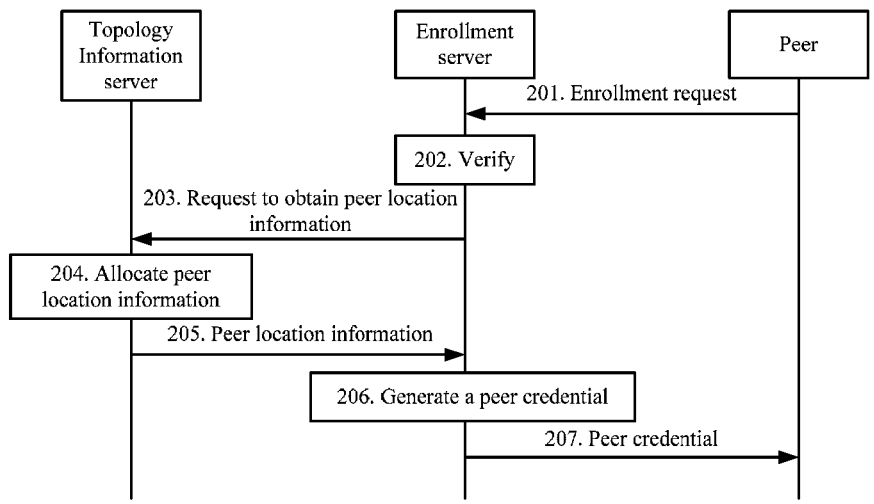
FIG. 2 is a signaling flowchart of a peer enrollment method according to a first embodiment of the present application.

As shown in FIG. 2, the peer enrollment method in the first embodiment of the present application includes the following steps:

201. A peer sends an enrollment request to an enrollment server.

In this embodiment, when a new peer requests joining an existing P2P network, the peer sends an enrollment request to the enrollment server, where the enrollment request carries identity information of the peer. The specific identity information may be a peer ID, or a peer name, or any other information that can uniquely specify the peer, and is not limited here.

202. The enrollment server verifies identity information of the peer.

After the enrollment server receives the enrollment request sent by the peer, the enrollment server verifies the identity information carried in the request. The specific verification process may be as follows: judge whether the peer belongs to a preset blacklist or whether the peer belongs to a list that allows to join the P2P network. Or other verification modes may also be used, and a specific mode is not limited here.

203. The enrollment server requests the topology information server for peer location information.

If the enrollment server verifies the peer successfully, the enrollment server may send a request to the topology information server to obtain the peer location information of the peer.

The topology information server in this embodiment may be a topology information server (namely an iTracker server) deployed by an operator, or a trusted topology information server deployed by a third party, or an official/non-official device that can know peer location information through some algorithms or protocols.

204. The topology information server allocates peer location information.

After receiving the request of the enrollment server, the topology information server may allocate peer location information for the peer. The peer location information in this embodiment may be an autonomous system ID, or an area ID, or peer coordinates, or other information that can identify the location of the peer, and is not limited here.

205. The topology information server sends peer location information to the enrollment server.

After allocating the peer location information, the topology information server sends the peer location information to the enrollment server.

206. The enrollment server generates a peer credential.

After obtaining the peer location information of the peer, the enrollment server carries the peer location information in the peer credential. The peer credential may be a preset template structure, is generated by the enrollment server, and carries information used for anti-counterfeiting. Each peer may identify the anti-counterfeiting information through some special algorithms to determine whether the peer credential is a legal credential. For example, the peer credential carries a character string, and a piece of check information may be obtained through a corresponding algorithm (for example, hash operation, complement or negation). If the check information is the same as preset check information, it is determined that the peer credential is a legal credential.

It should be noted that the specific anti-counterfeiting information may also use other modes. The specific mode is not limited here.

207. The enrollment server sends the peer credential to the peer.

After generating the peer credential, the enrollment server may send the generated peer credential to the peer for the peer to use when the peer joins the P2P network.

It should be noted that in this embodiment, the topology information server and the enrollment server may be separated, or may be integrated to form an integrated server. A specific implementation mode is not limited here.

In this embodiment, the enrollment server may obtain peer location information of the peer from the topology information server. Therefore, the enrollment server may send a peer credential carrying peer location information to the peer. In this way, the peer may carry the peer credential when joining the P2P network. By using peer credentials of other peers in the P2P network, the routing table of each peer can be updated. Because the peer credential of each peer is issued by the enrollment server uniformly, it is difficult for a malicious peer to modify the peer credential, that is, it is difficult to modify peer location information of the peer, the malicious peer is effectively prevented from advertising malicious routes and security of the P2P network is improved.

II. The enrollment server obtains peer location information through a content delivery network (CDN) redirection server.

Figure 3:
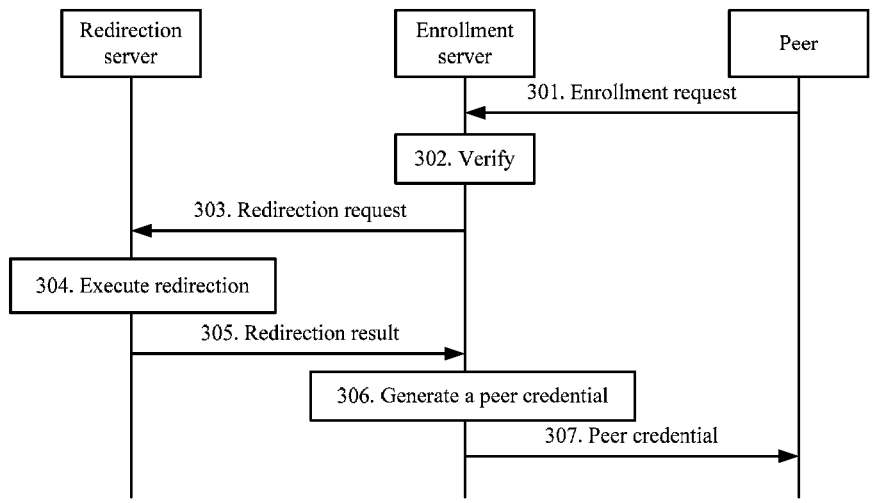
FIG. 3 is a signaling flowchart of a peer enrollment method according to a second embodiment of the present application.

As shown in FIG. 3, the peer enrollment method in the second embodiment of the present application includes the following steps:

301. A peer sends an enrollment request to an enrollment server.

In this embodiment, when a new peer requests joining an existing P2P network, the peer sends an enrollment request to the enrollment server, where the enrollment request carries identity information of the peer. The specific identity information may be a peer ID, or a peer name, or any other information that can uniquely specify the peer, and is not limited here.

302. The enrollment server verifies identity information of the peer.

After receiving the enrollment request sent by the peer, the enrollment server verifies the identity information carried in the request. The specific verification process may be as follows: judge whether the peer belongs to a preset blacklist or whether the peer belongs to a list that allows to join the P2P network. Or other verification modes may also be used, and the specific mode is not limited here.

303. The enrollment server sends a redirection request to the CDN redirection server.

If the enrollment server verifies the peer successfully, the enrollment server may send a redirection request to the CDN redirection server to request the CDN redirection server to determine the closest edge server serving the peer, where the redirection request carries the identity information of the peer.

304. The CDN redirection server executes redirection.

After receiving the redirection request of the enrollment server, the CDN redirection server determines, according to the identity information in the redirection request, the edge server that provides services for the peer and is closest to the peer, and obtains the address of the edge server.

It should be noted that the process of the CDN redirection server executing redirection in this embodiment is based on the prior art and is not limited here.

305. The CDN redirection server sends a redirection result to the enrollment server.

The CDN redirection server may obtain the address of the edge server after executing redirection, and use the address of the edge server as the redirection result and send the address to the enrollment server.

306. The enrollment server generates a peer credential.

After obtaining the address of the edge server, the enrollment server uses the address of the edge server as the peer location information of the peer and carries it in the peer credential. The peer credential may be a preset template structure, is generated by the enrollment server, and carries information used for anti-counterfeiting. Each peer may identify the anti-counterfeiting information through some special algorithms to determine whether the peer credential is a legal credential. For example, the peer credential carries a character string, and a piece of check information may be obtained through a corresponding algorithm (for example, hash operation, complement or negation). If the check information is the same as preset check information, it is determined that the peer credential is a legal credential.

It should be noted that the specific anti-counterfeiting information may also use other modes. A specific mode is not limited here.

In this embodiment, the enrollment server may directly use the address of the edge server as peer location information of the peer and carry it in the peer credential. The enrollment server may also convert the address of the edge server according to the preset algorithm, and use the converted location ID as peer location information and carry it in the peer credential. For example, assuming the address of the edge server is A.A.A.A, the enrollment server may search the preset mapping relationship to find that the location ID corresponding to the address is X, and therefore the enrollment server may use X as peer location information and carry it in the peer credential. It should be noted that if the enrollment server uses the location ID as the peer location information, the peers that join the P2P network should have identification capabilities. Specifically, the mapping relationship may be preset in each peer, or each peer may obtain the mapping relationship from a server.

307. The enrollment server sends the peer credential to the peer.

After generating the peer credential, the enrollment server may send the generated peer credential to the peer for the peer to use when the peer joins the P2P network.

In this embodiment, the enrollment server may obtain the address of the edge server from the CDN redirection server and use the address as peer location information of the peer. Therefore, the enrollment server may send a peer credential carrying peer location information to the peer. In this way, the peer will carry the peer credential when joining the P2P network. By using peer credentials of other peers in the P2P network, the routing table of each peer can be updated. Because the peer credential of each peer is issued by the enrollment server uniformly, it is difficult for a malicious peer to modify the peer credential, that is, it is difficult to modify peer location information of the peer, the malicious peer is effectively prevented from advertising malicious routes and security of the P2P network is improved.

Described above is the peer enrollment process. The following describes the route updating process in embodiments of the present application. For ease of understanding, the following details the route updating method in embodiments of the present application with two specific instances.

I. A message receiver requests a peer credential.

Figure 4:
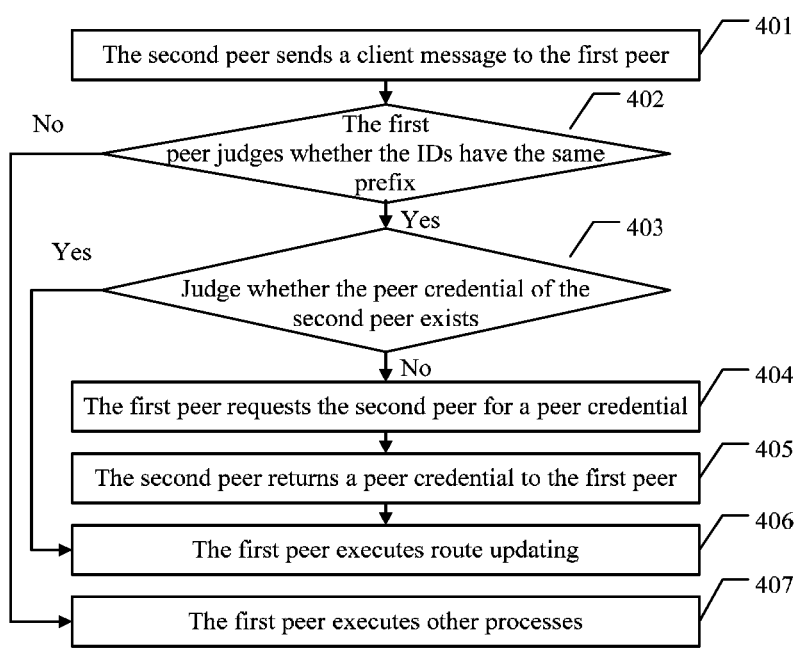
FIG. 4 is a signaling flowchart of a route updating method according to a first embodiment of the present application.

As shown in FIG. 4, the route updating method in the first embodiment of the present application includes the following steps:

401. The second peer sends a client message to the first peer.

In this embodiment, the first peer is a new peer that joins the P2P network, and the second peer is a peer that already exists in the P2P network.

The second peer sends a client message to the first peer for communication, where the client message carries a peer ID of the second peer. The client message in this embodiment may be a P2P signaling message.

402. The first peer judges whether the IDs have the same prefix, and if the IDs have the same prefix, executes step 403, or if the IDs do not have the same prefix, executes step 407.

After receiving the client message sent by the second peer, the first peer reads the peer ID of the second peer in the client message, and judges whether the peer ID of the first peer has the same prefix as the peer ID of the second peer.

It should be noted that if the peer IDs of both peers have the same prefix, route information may be forwarded between the two peers.

Both the first peer and the second peer in this embodiment store route information, where the route information includes three parts: "leaf set", "routing table", and "neighbor set". It is recorded in the leaf set that several peers whose peer IDs are closest to the peer ID; the routing table records several peers that have the same prefix as the peer; and it is recorded in the neighbor set that several peers that are closest to the peer in physical distance.

403. Judge whether the peer credential of the second peer exists, and if so, execute step 406, or if not, execute step 404.

In this embodiment, after the first peer determines that the peer ID of the first peer has the same prefix as the peer ID of the second peer, the first peer judges whether the peer credential of the second peer is stored locally.

404. The first peer requests the second peer for a peer credential.

If the first peer determines that the peer credential of the second peer is not stored locally, the first peer requests the second peer for a peer credential.

405. The second peer returns a peer credential to the first peer.

After the second peer receives the request of the first peer, the second peer returns the peer credential of the second peer to the first peer. The peer credential is sent by the enrollment server to the second peer when the second peer is enrolled. The specific enrollment process is the same as the peer enrollment process described in the above embodiments, and is not further described here.

406. The first peer executes route updating.

If the first peer stores the peer credential of the second peer locally, or after the first peer receives the peer credential sent by the second peer, the first peer may identify the peer credential, because the peer credential may carry anti-counterfeiting information, the first peer may judge whether the peer credential is a legal peer credential according to the anti-counterfeiting information; if it is an illegal credential, the first peer may send a reject message to the second peer. The specific process of detecting whether the peer credential is legal may be as follows:

Identify the anti-counterfeiting information through some special algorithms to determine whether the peer credential is legal. For example, the peer credential carries a character string, and a piece of check information may be obtained through a corresponding algorithm (for example, hash operation, complement or negation). If the check information is the same as preset check information, it is determined that the peer credential is a legal credential.

After the peer credential is determined as legal, the peer location information in the peer credential may be obtained, where the peer location information indicates the peer location of the second peer.

Because the first peer may also receive a peer credential from the enrollment server during enrollment, and the peer credential also carries peer location information of the first peer, the first peer may judge whether the second peer is the peer closest to the first peer in physical distance according to the location information of the two peers; if the second peer is the peer closest to the first peer in physical distance, the first peer records the second peer in the "neighbor set" in the route information of the first peer.

It should be noted that if the "neighbor set" in the route information of the first peer already includes a third peer, the first peer compares the physical distance between the first peer and the third peer with the physical distance between the first peer and the second peer, judges which peer is closer to the first peer, and records the closer peer in the "neighbor set" in the route information of the first peer.

407. The first peer executes other processes.

If the first peer reads the peer ID of the second peer in the client message, and determines that the peer ID of the first peer has no same prefix as the peer ID of the second peer, it indicates that route information cannot be forwarded between the two peers. Therefore, the first peer may execute other handling processes, for example, return error information to the second peer. The specific handling process is not limited here.

In this embodiment, peer location information may be an autonomous system ID, or an area ID, or peer coordinates allocated by the topology information server, or an address of the edge server determined by the CDN redirection server, or other information that can identify the location of the peer.

In this embodiment, the process of judging the physical distance between two peers according to the peer location information is based on the prior art, and is not limited here.

In this embodiment, the peer credential obtained by the first peer from the second peer is issued by the enrollment server. It is difficult for a malicious peer to modify the peer credential, that is, it is difficult to modify peer location information of the peer. Therefore the malicious peer is effectively prevented from advertising malicious routes and security of the P2P network is improved.

II. A message sender carries a peer credential automatically.

Figure 5:
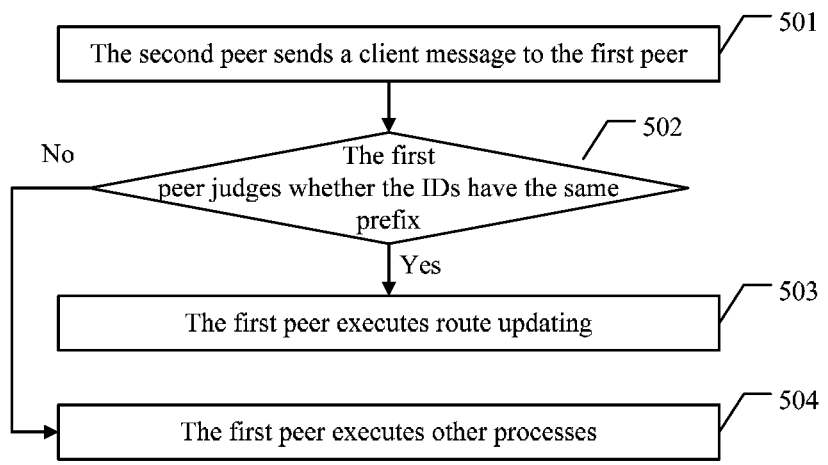
FIG. 5 is a signaling flowchart of a route updating method according to a second embodiment of the present application.

As shown in FIG. 5, the route updating method in the second embodiment of the present application includes the following steps:

501. The second peer sends a client message to the first peer.

In this embodiment, the first peer is a new peer that joins the P2P network, and the second peer is a peer that is already located in the P2P network.

The second peer sends a client message to the first peer, where the client message carries the peer ID and a peer credential of the second peer.

In this embodiment, the P2PSIP working group of the Internet Engineering Task Force (IETF) puts forward a resource location method called RELOAD. In this method, the peer carries the credential information of the peer automatically when forwarding a query message.

502. The first peer judges whether the IDs have the same prefix, and if the IDs have the same prefix, executes step 503, or if the IDs do not have the same prefix, executes step 504.

After receiving the client message sent by the second peer, the first peer reads the peer ID of the second peer in the client message, and judges whether the peer ID of the first peer has the same prefix as the peer ID of the second peer.

It should be noted that if the peer IDs of both peers have the same prefix, route information may be forwarded between the two peers.

Both the first peer and the second peer in this embodiment store route information, where the route information includes three parts: "leaf set", "routing table", and "neighbor set". it is recorded in the leaf set that several peers whose peer IDs are closest to the peer ID; the routing table records several peers that have the same prefix as the peer; and it is recorded in the neighbor set that several peers that are closest to the peer in physical distance.

503. The first peer executes route updating.

After the first peer reads the peer credential of the second peer from the client message sent by the second peer, the first peer may identify the peer credential. Because the peer credential carries anti-counterfeiting information, the first peer may judge whether the peer credential is a legal peer credential according to the anti-counterfeiting information; if it is an illegal credential, the first peer may send a reject message to the second peer. The specific process of detecting whether the peer credential is legal may be as follows:

Identify the anti-counterfeiting information through some special algorithms to determine whether the peer credential is legal. For example, the peer credential carries a character string, and a piece of check information may be obtained through a corresponding algorithm (for example, hash operation, complement or negation). If the check information is the same as preset check information, it is determined that the peer credential is a legal credential.

After the peer credential is determined as legal, the peer location information in the peer credential may be obtained, where the peer location information indicates the peer location of the second peer.

Because the first peer may also receive a peer credential from the enrollment server during enrollment, and the peer credential also carries peer location information of the first peer, the first peer may judge whether the second peer is the peer closest to the first peer in physical distance according to the location information of the two peers; if the second peer is the peer closest to the first peer in physical distance, the first peer records the second peer in the "neighbor set" in the route information of the first peer.

It should be noted that if the "neighbor set" in the route information of the first peer already includes a third peer, the first peer compares the physical distance between the first peer and the third peer with the physical distance between the first peer and the second peer, judges which peer is closer to the first peer, and records the closer peer in the "neighbor set" in the route information of the first peer.

504. The first peer executes other processes.

If the first peer reads the peer ID of the second peer in the client message, and determines that the peer ID of the first peer has no same prefix as the peer ID of the second peer, it indicates that route information cannot be forwarded between the two peers. Therefore, the first peer may execute other handling processes, for example, return error information to the second peer. The specific handling process is not limited here.

In this embodiment, peer location information may be an autonomous system ID, or an area ID, or peer coordinates allocated by the topology information server, or an address of the edge server determined by the CDN redirection server, or other information that can identify the location of the peer.

In this embodiment, the process of judging the physical distance between two peers according to the peer location information is based on the prior art, and is not limited here.

In this embodiment, the peer credential obtained by the first peer from the second peer is issued by the enrollment server. It is difficult for a malicious peer to modify the peer credential, that is, it is difficult to modify peer location information of the peer. Therefore the malicious peer is effectively prevented from advertising malicious routes and security of the P2P network is improved.

Figure 6:
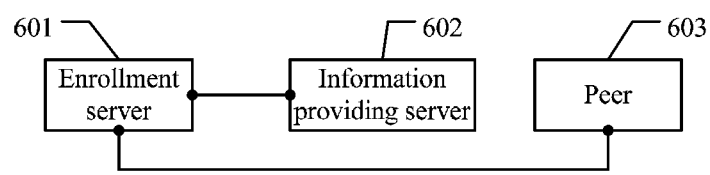
FIG. 6 is a schematic diagram of a communication system according to a first embodiment of the present application.

A communication system is provided in an embodiment of the present application, and is configured to implement the above peer enrollment method of the present application. As shown in FIG. 6, a communication system in the first embodiment of the present application includes:

an enrollment server 601, configured to: receive an enrollment request of a peer 603, where the enrollment request carries identity information of the peer 603; verify the identity information of the peer; if the verification succeeds, obtain peer location information of the peer 603, and send a peer credential carrying the peer location information to the peer 603; and the peer 603, configured to: send the enrollment request to the enrollment server 601, where the enrollment request carries the identity information of the peer 603; and receive the peer credential that is sent by the enrollment server 601 and carries the peer location information.

The communication system in this embodiment may further include:

an information providing server 602, configured to provide peer location information of the peer 603 to the enrollment server 601.

The information providing server 602 in this embodiment may be a topology information server.

In this case, the enrollment server 601 sends the identity information of the peer 603 to the topology information server, and receives the peer location information returned by the topology information server.

The topology information server is configured to allocate peer location information for the peer 603 according to the identity information sent by the enrollment server 601, and return the peer location information to the enrollment server 601, where the peer location information is an autonomous system ID, or an area ID, or peer coordinates.

The information providing server 602 in this embodiment may also be a CDN redirection server.

In this case, the enrollment server 601 sends the identity information of the peer 603 to the CDN redirection server, and receives the peer location information returned by the CDN redirection server.

The CDN redirection server is configured to: determine the address of the edge server closest to the peer 603 according to the identity information sent by the enrollment server 601, use the address of the edge server as the peer location information of the peer 603, and send the information to the enrollment server 601.

The enrollment server 601 in this embodiment may also convert the address of the edge server into the corresponding location ID according to the preset algorithm, and use the location ID as the peer location information of the peer 603.

In this embodiment, the enrollment server 601 may obtain peer location information of the peer 603 from the information providing server 602. Therefore, the enrollment server 601 may send a peer credential carrying peer location information to the peer 603. In this way, the peer 603 may carry the peer credential when joining the P2P network. By using peer credentials of other peers in the P2P network, the routing table of each peer can be updated. Because the peer credential of each peer is issued by the enrollment server 601 uniformly, it is difficult for a malicious peer to modify the peer credential, that is, it is difficult to modify peer location information of the peer, the malicious peer is effectively prevented from advertising malicious routes and security of the P2P network is improved.

Figure 7:
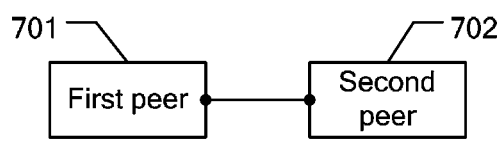
FIG. 7 is a schematic diagram of a communication system according to a second embodiment of the present application.

A communication system is provided in an embodiment of the present application, and is configured to implement the above route updating method of the present application. As shown in FIG. 7, the communication system in the second embodiment of the present application includes: a first peer 701 and a second peer 702.

The first peer 701 is configured to: receive a client message sent by the second peer 702; judge whether the first peer 701 stores a peer credential of the second peer 702, and if the first peer 701 does not store a peer credential of the second peer 702, the first peer 701 request the second peer 702 for the peer credential and receive the peer credential sent by the second peer 702, where the peer credential is sent by an enrollment server to the second peer 702 when the second peer 702 is enrolled; and judge whether the second peer 702 is the peer closest to the first peer 701 in physical distance according to peer location information of the first peer 701 and peer location information of the second peer 702 in the peer credential, and if the second peer 702 is the peer closest to the first peer 701 in physical distance, update a routing table stored by the first peer 701.

The second peer 702 is configured to: send the client message to the first peer 701, receive the peer credential request sent by the first peer 701, and return the peer credential to the first peer 701.

The communication system described above may be applied in a route updating process and in a scenario where a message receiver requests a peer credential. The following describes the scenario where a message sender carries a peer credential automatically in the route updating process.

The communication system in the second embodiment of the present application includes: a first peer 701 and a second peer 702.

The first peer 701 is configured to: receive a client message sent by the second peer 702, where the client message carries a peer credential of the second peer 702 and the peer credential is sent by an enrollment server to the second peer 702 when the second peer 702 is enrolled; judge whether the second peer 702 is the peer closest to the first peer 701 in physical distance according to peer location information of the first peer 701 and peer location information of the second peer 702 in the peer credential, and if the second peer 702 is the peer closest to the first peer 701 in physical distance, update a routing table stored by the first peer 701.

The second peer 702 is configured to send the client message to the first peer 701, where the client message carries the peer credential of the second peer 702.

In the communication system of this embodiment, the peer credential obtained by the first peer 701 from the second peer 702 is issued by the enrollment server. It is difficult for a malicious peer to modify the peer credential, that is, it is difficult to modify peer location information of the peer. Therefore the malicious peer is effectively prevented from advertising malicious routes and security of the P2P network is improved.

Figure 8:
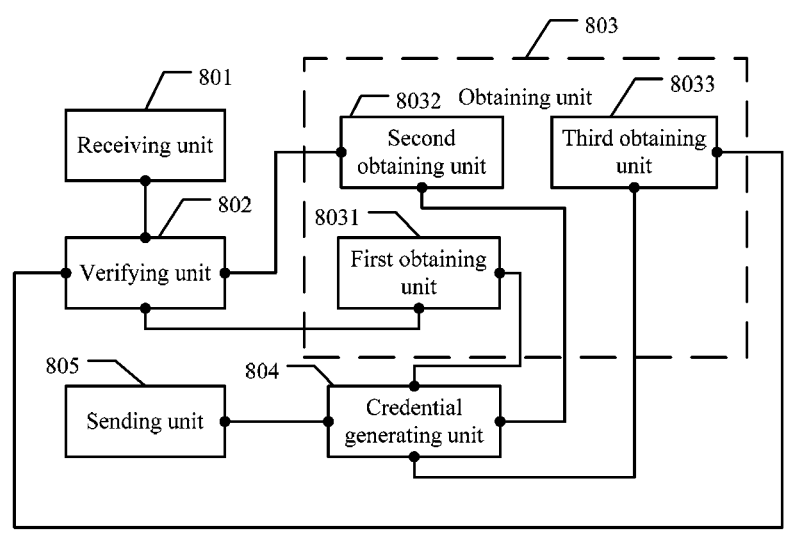
FIG. 8 is a schematic diagram of a server according to an embodiment of the present application.

A server is provided in an embodiment of the present application, and is configured to implement the above peer enrollment method of the present application. As shown in FIG. 8, the server provided in this embodiment of the present application includes:

a receiving unit 801, configured to receive an enrollment request of a peer, where the enrollment request carries identity information of the peer;

a verifying unit 802, configured to verify the identity information;

an obtaining unit 803, configured to obtain peer location information of the peer after the verifying unit 802 verifies the identity information successfully;

a credential generating unit 804, configured to generate a peer credential according to the peer location information; and a sending unit 805, configured to send the peer credential carrying the peer location information to the peer.

The obtaining unit 803 in this embodiment may further include:

a first obtaining unit 8031, configured to: send identity information of the peer to a topology information server and receive peer location information of the peer returned by the topology information server, where the peer location information is an autonomous system ID, or an area ID, or peer coordinates allocated by the topology information server for the peer according to the identity information;

or a second obtaining unit 8032, configured to: send identity information of the peer to a CDN redirection server, receive the address of an edge server returned by the CDN redirection server, where the address of the edge server is the address of the edge server that is determined by the CDN redirection server for the peer as closest to the peer according to the identity information, and use the address of the edge server as peer location information of the peer;

or a third obtaining unit 8033, configured to: send identity information of the peer to a CDN redirection server, receive the address of an edge server returned by the CDN redirection server, where the address of the edge server is the address of the edge server that is determined by the CDN redirection server for the peer as closest to the peer according to the identity information, convert the address of the edge server into the corresponding location ID according to the preset algorithm, and use the location ID as peer location information of the peer.

In this embodiment, the obtaining unit 803 of the server may obtain peer location information of the peer from the topology information server or CDN redirection server. Therefore, a peer credential carrying peer location information may be sent to the peer. In this way, the peer may carry the peer credential when joining the P2P network. By using peer credentials of other peers in the P2P network, the routing table of each peer can be updated. Because the peer credential of each peer is issued by the enrollment server uniformly, it is difficult for a malicious peer to modify the peer credential, that is, it is difficult to modify peer location information of the peer, the malicious peer is effectively prevented from advertising malicious routes and security of the P2P network is improved.

Figure 9:
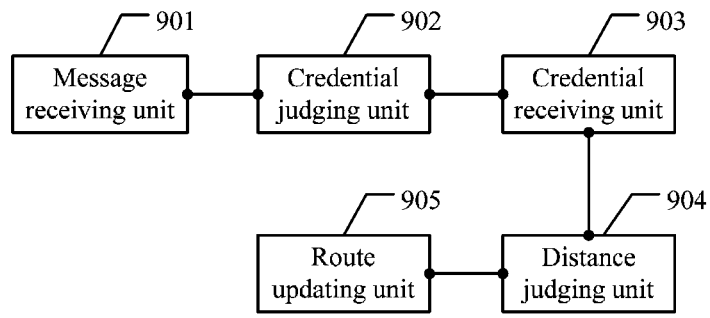
FIG. 9 is a schematic diagram of a network peer according to an embodiment of the present application.

A communication system is provided in an embodiment of the present application, and is configured to implement the above route updating method of the present application. As shown in FIG. 9, the network peer provided in this embodiment of the present application includes:

a message receiving unit 901, configured to receive a client message sent by a second peer;

a credential judging unit 902, configured to judge whether the network peer stores a peer credential of the second peer, and if the network peer does not store a peer credential of the second peer, request the second peer for the peer credential;

a credential receiving unit 903, configured to receive the peer credential sent by the second peer, where the peer credential is sent by the enrollment server to the second peer when the second peer is enrolled;

a distance judging unit 904, configured to judge whether the second peer is the peer closest to the first peer in physical distance according to peer location information of the network peer and peer location information of the second peer that is in the peer credential; and a route updating unit 905, configured to update a routing table if the second peer is the peer closest to the first peer in physical distance.

The route updating process executed by the route updating unit 905 is the same as the route updating process described in the route updating method above, and is not further described here.

It should be noted that, the credential judging unit 902 in this embodiment is optional. If the client message sent by the second peer carries the peer credential of the second peer, the credential judging unit 902 is not required.

In this embodiment, the peer credential obtained by the network peer from the second peer is issued by the enrollment server. It is difficult for a malicious peer to modify the peer credential, that is, it is difficult to modify peer location information of the peer. Therefore the malicious peer is effectively prevented from advertising malicious routes and security of the P2P network is improved.

It is understandable to those skilled in the art that all or part of steps of the foregoing embodiments may be implemented by related hardware instructed by a program. The program may be stored in a computer readable storage medium. When the program is executed, the process includes:

receiving an enrollment request of a peer, where the enrollment request carries identity information of the peer;

verifying the identity information, and if the verification succeeds, obtaining peer location information of the peer, and generating a peer credential according to the peer location information; and sending the peer credential carrying the peer location information to the peer so that the peer joins the network according to the peer credential.

The above storage medium may be a read-only memory, a magnetic disk or an optical disc.

Detailed above are a peer enrollment method, a route updating method, a communication system, and relevant devices according to the present application. It is apparent that those skilled in the art can make modifications and variations according to the idea of the application. Therefore, the specification shall not be construed as a limitation on the application.

What is claimed is:

1. A peer enrollment method comprising:
   receiving, by an enrollment server in a peer-to-peer network, an enrollment request of a peer device, wherein the enrollment request comprises identity information of the peer device;
   verifying, by the enrollment server, the identity information of the peer device, and when the verification succeeds, obtaining peer location information of the peer device, and generating a peer credential of the peer device according to the peer location information, wherein the peer credential includes anti-counterfeiting information which verifies the peer credential, wherein the anti-counterfeiting information comprises a character string for generating check information by applying an algorithm and the peer credential is verified by comparing the generated check information and preset check information; and
   sending, by the enrollment server, the peer credential comprising the peer location information to the peer device, wherein the peer credential is used by the peer device to join the peer-to-peer network, the peer-to-peer network configured to prevent malicious peers without peer credentials from joining, and
   wherein upon successfully joining the peer-to-peer network, a second peer device in the peer-to-peer network updates a routing table of the second peer device according to the peer credential of the peer device.

2. The method of claim 1, wherein the obtaining the peer location information of the peer device comprises:
   sending a request for obtaining the peer location information to a topology information server, wherein the request carries the identity information of the peer device; and
   receiving the peer location information of the peer device returned by the topology information server, wherein the peer location information is one of the following:
   an autonomous system identification (ID) allocated by the topology information server for the peer device according to the identity information,
   an area ID allocated by the topology information server for the peer device according to the identity information, and
   peer coordinates allocated by the topology information server for the peer device according to the identity information.

3. The method of claim 1, wherein the obtaining the peer location information of the peer device comprises:
   sending a request for obtaining the peer location information to a content delivery network (CDN) redirection server, wherein the request comprises the identity information of the peer device;
   receiving an address of an edge server which is closest to the peer device in a physical distance, returned by the CDN redirection server, wherein the address of the edge server is determined by the CDN redirection server for the peer device according to the identity information; and
   using the address of the edge server as the peer location information of the peer device.

4. The method of claim 1, wherein the obtaining the peer location information of the peer device comprises:
   sending a request for obtaining the peer location information to a content delivery network (CDN) redirection server, wherein the request comprises the identity information of the peer device;
   receiving an address of an edge server which is the closest to the peer device in a physical distance, returned by the CDN redirection server, wherein the address of the edge server is determined by the CDN redirection server for the peer device according to the identity information;
   converting the address of the edge server into a corresponding location identification (ID) according to a preset algorithm; and
   using the corresponding location ID as the peer location information of the peer device.

5. The method of claim 1, wherein the peer credential is a preset template structure.

6. A communication system comprising:
   an enrollment server in a peer-to-peer network, configured to receive an enrollment request of a peer device, wherein the enrollment request comprises identity information of the peer device; verify the identity information of the peer device; when the verification succeeds, obtain peer location information of the peer device, and send a peer credential comprising the peer location information to the peer device, wherein the peer credential carries anti-counterfeiting information which verifies the peer credential, wherein the anti-counterfeiting information comprises a character string for generating check information by applying an algorithm and the peer credential is verified by comparing the generated check information and preset check information; and
   the peer device, configured to send the enrollment request to the enrollment server, wherein the enrollment request comprises the identity information of the peer device; receive the peer credential that is sent by the enrollment server and comprises the peer location information; and join the peer-to-peer network according to the peer credential, wherein the peer-to-peer network is configured to prevent malicious peers without peer credentials from joining, and wherein upon successfully joining the peer-to-peer network, a second peer device in the peer-to-peer network updates a routing table of the second peer device according to the peer credential of the peer device.

7. The communication system of claim 6, further comprising:
   an information providing server, configured to provide the peer location information of the peer device to the enrollment server.

8. The communication system of claim 7, wherein:
   the information providing server is a topology information server;
   the enrollment server is further configured to send the identity information of the peer device to the topology information server, and receive the peer location information returned by the topology information server; and the topology information server is configured to allocate the peer location information for the peer device according to the identity information sent by the enrollment server, and return the peer location information to the enrollment server, wherein the peer location information is one of an autonomous system identification (ID), an area ID, and peer coordinates.

9. The communication system of claim 7, wherein:

the information providing server is a content delivery network (CDN) redirection server;

the enrollment server is further configured to send the identity information of the peer device to the CDN redirection server, and receive the peer location information returned by the CDN redirection server; and the CDN redirection server is configured to determine an address of an edge server closest to the peer device in a physical distance, according to the identity information sent by the enrollment server, use the address of the edge server as the peer location information of the peer device, and send the peer location information to the enrollment server.

10. The communication system of claim 9, wherein the enrollment server is further configured to convert the address of the edge server into a corresponding location identification (ID) according to a preset algorithm and use the location ID as the peer location information of the peer device.

11. The communication system of claim 6, wherein the peer credential is a preset template structure.

12. A server in a peer-to-peer network, the server comprising:

a hardware processor; and a non-transitory processor readable medium having processor-executed instructions stored thereon, the processor-executed instructions including a plurality of units, the units including:

a receiving unit, configured to receive an enrollment request of a peer device, wherein the enrollment request carries identity information of the peer device;

a verifying unit, configured to verify the identity information of the peer device;

an obtaining unit, configured to obtain peer location information of the peer device after the verifying unit verifies the identity information successfully;

a credential generating unit, configured to generate a peer credential according to the peer location information, wherein the peer credential carries anti-counterfeiting information which verifies the peer credential, wherein the anti-counterfeiting information comprises a character string for generating check information by applying an algorithm and the peer credential is verified by comparing the generated check information and preset check information; and a sending unit, configured to send the peer credential carrying the peer location information to the peer device, wherein the peer credential is used by the peer device to join the peer-to-peer network, the peer-to-peer network configured to prevent malicious peers without peer credentials from joining, and wherein upon successfully joining the peer-to-peer network, a second peer device in the peer-to-peer network updates a routing table of the second peer device according to the peer credential of the peer device.

13. The server of claim 12, wherein the obtaining unit comprises one of a first obtaining unit, a second obtaining unit and a third obtaining unit, wherein:

the first obtaining unit is configured to send the identity information of the peer device to a topology information server and receive peer location information of the peer device returned by the topology information server, wherein the peer location information is one of: an autonomous system identification (ID) allocated by the topology information server for the peer device according to the identity information, an area ID allocated by the topology information server for the peer device according to the identity information, and peer coordinates allocated by the topology information server for the peer device according to the identity information;

the second obtaining unit is configured to send the identity information of the peer device to a content delivery network (CDN) redirection server, receive an address of an edge server returned by the CDN redirection server, wherein the address of the edge server which is the closest to the peer device in a physical distance, is determined by the CDN redirection server for the peer device according to the identity information, and use the address of the edge server as the peer location information of the peer device; and the third obtaining unit is configured to send the identity information of the peer device to the CDN redirection server, receive the address of the edge server returned by the CDN redirection server, wherein the address of the edge server which is the closest to the peer device in a physical distance, is determined by the CDN redirection server for the peer device according to the identity information, convert the address of the edge server into a corresponding location ID according to a preset algorithm, and use the corresponding location ID as the peer location information of the peer device.

14. The server of claim 12, wherein the peer credential is a preset template structure.

* * * * *